(12) United States Patent
Alvarez (10) Patent No.: US 6,224,025 B1
(45) Date of Patent: May 1, 2001

(54) SNAP-ON/TWIST-IN PIPE SADDLE AND INSTALLATION METHOD

(76) Inventor: Luis Jullian Alvarez, 9 Carteret Dr., Pomona, NY (US) 10970

( * ) Notice: Subject to any disclaimer, the term of this patent is extended or adjusted under 35 U.S.C. 154(b) by 0 days.

(21) Appl. No.: 09/302,174

(22) Filed: Apr. 29, 1999

(51) Int. Cl.[7] ........................................... E21F 17/02
(52) U.S. Cl. .................. 248/58; 24/339; 248/62; 403/348
(58) Field of Search ..................... 248/58, 59, 62, 248/63; 403/348; 24/339

(56) References Cited

U.S. PATENT DOCUMENTS

| | | | |
|---|---|---|---|
| 4,784,552 | * 11/1988 | Rebentisch | 403/348 X |
| 5,704,571 | * 1/1998 | Vargo | 248/58 |
| 5,924,655 | * 7/1999 | Rinderer | 248/58 X |

* cited by examiner

Primary Examiner—Ramon O. Ramirez
(74) Attorney, Agent, or Firm—Richard T. Holzmann (57) ABSTRACT

An arcuate molded flexible plastic pipe saddle for supporting an insulated pipe secured to a surface having a pair of flexible hinge-like joints molded integrally therewith for accommodating insulated pipes of varying overall diameters, and having stiffening ribs molded similarly for strengthening the saddle under load, and means molded integrally with the saddle at the external central underside thereof for attachment of the saddle to a support means. Typical support means may be a U-shaped pipe-supporting member, such as a clevis hanger, for use with a clip-in fixture or a support channel for use with a drop-in twist-and-lock fixture for holding the saddle and adjustable means for securing said U-shaped pipe-supporting member to an overhead surface. The support channel may be used for overhead or underfoot surfaces. For vertical surfaces, a hanging J-shaped wall support member in conjunction with the clip-in version is indicated. Methods of installation are disclosed.

13 Claims, 9 Drawing Sheets

SNAP-ON/TWIST-IN PIPE SADDLE AND INSTALLATION METHOD

FIELD OF THE INVENTION

This invention relates generally to devices for supporting elongated structures and more particularlly to devices for supporting insulated pipes.

BACKGROUND

In many industrial applications, various pipes, conduits, tubes and the like are designed to convey hot or cold materials such as steam, chemicals, hot oil, coolant, refrigerant, chilled water, warm and cooled air, etc. It is common practice to insulate such pipes not only to maintain the conveyed material as near as possible to desired temperature, but also, in the case of cold materials, to prevent "sweating" which occurs because of condensation of ambient moisture on a cool pipe surface, frequently with attendant rusting of parts. Furthermore, modern new technology construction codes frequently require that all pipes carrying materials of temperatures differing significantly from the ambient temperature must be insulated. Thus, the industry standard today maintains the integrity of the insulated pipe throughout its length.

In a typical construction application an insulated pipe will be displaced from the support structure such that it may be necessary to support it by virtue of hangers if the pipe is to be supported from above, by cantilevers if the pipe is to be supported from the side, and by pedestals if the pipe is to be supported from below. In each of these cases it is necessary that a firm contact restricting the pipe from movement in the directions perpendicular to its axis be achieved between the support member and the pipe.

To achieve a maximum insulating effect, it has been the usual practice to insulate the entire length of pipe and place a hanger on the outside in contact with the insulation. Consequently, the insulation itself acts as a structural member in supporting the pipe. The portions of such hangers contacting the insulation normally are of relatively narrow width, resulting in large stress concentrations over a small area of the insulation.

Since thermal pipe insulation is by nature porous and fragile, these stress concentrations of pressure over a relatively small area frequently crush the insulation. In time, often aided by vibration or jarring of the pipe, the crushed area continues to deteriorate, forming not only an unsightly appearance but, more seriously, reducing the desired insulating effect.

Consequently, it is necessary that the insulating material utilized have significant load-bearing capacity so as to prevent crushing of the insulating material and diminution of its insulating characteristics which requires much greater density and load-carrying ability than material which may be utilized at intermediate points wherein no load-carrying capacity is required. Such higher density load-carrying material is more costly to manufacture and machine than the lower density insulation utilized on the remainder of the pipe.

Conventionally, in long horizontal pipe runs, it has been necessary to support pipe by means of spaced clevis pipe hangers. In the event that the pipe required thermal or acoustical insulation, blocks were utilized to temporarily support the bared pipe in the pipe hangers. Such blocks would then be removed as special insulation was inserted around the pipe adjacent the pipe hanger. At each hanger is an insulation assembly, typically cylindrical, around which the hanger extends. Common materials used for making components of these insulation assemblies are calcium silicate, foam polymer, cellular or fibrous glass. Materials such as glass fiber or calcium silicate have the disadvantages of being brittle, having insufficient supporting strength, and lack of compressibility.

During installation of these systems, workmen who suspend the piping typically install the lower, generally semi-cylindrical block beneath the pipe when installing the hanger. The upper part is left to insulation installing workmen who subsequently install insulation jackets over the length of the pipe between the hangers. Insulation installers dislike the task of inserting the upper block and completing assembly of the hanger arrangement since it is difficult to get the various components properly assembled with each other while the pipe is suspended. Consequently, less than a desirable job is too often performed. Another fairly common occurrence is the tendency for the hanger to slip off the end of the installed lower insulation block. All of these factors detract from proper insulation and/or suspension of the pipe.

A number of patents granted between 1970 and 1993 featured the above techniques. One such may be found by Bindel in U.S. Pat. No. 3,575,214 which teaches in accordance with one form of his invention, a strap or band type of hanger bracket passing around a bared section of insulated pipe to make direct contact with it. In this manner, the pipe insulation is not used as a structural member and is never either in compression or tension. To provide a bared section, the pipe insulation may be cut away, or the normal pipe insulation may be otherwise spaced apart to leave the exposed section of pipe. A premolded insulating shell, preferably of foamed or cellular resinous material, covers a substantial portion, if not all, of the hanger rod and extends around the bracket to cover and thereby insulate it.

March in U.S. Pat. No. 3,539,137 discloses a supporting bracket which positions and supports a reinforced plastic saddle or a steel saddle covered with a protective corrosion-resistant coating. A vapor barrier jacketing is secured to the saddle and an engineered support member formed of insulating material, such as, for example, a high precompressed fiberglass support is secured to the vapor barrier jacketing. It should be noted that in the trade such a saddle is often referred to as an insulation shield or a pipe covering protective shield.

McClellan in U.S. Pat. No. 4,323,088 also teaches an insulating support device comprising a first insulating support member adapted to slidably engage a second insulating support member so as to form therewith a cylindrical solid having an axial hole therethrough for receiving a pipe. Meanwhile, Williams in U.S. Pat. No. 5,192,039 discloses a hanger insulation system having a unitary pipe insulation and shield assembly of upper and lower partially insulation elements defining a cylindrical pipe receiving cavity to form a clamshell arrangement extendable about a pipe to snap fasten the clamp elements together. Williams in U.S. Pat. No. 4,146,203 disclosed a different approach but also requiring the use of the insulation with his system rather than the insulation already existing on the length of a pipe.

These disclosed teachings were primarily designed to eliminate or reduce the concentrations of pressure over a relatively small area. Nevertheless, in so doing additional problems were created. For example, blocks for temporary support were required as was extra, special insulation around the pipe adjacent the spaced clevis pipe hangers. Furthermore, these techniques required that a bared section of pipe be esposed by cutting away the conventional pipe insulation and substituting special high density, load-carrying insulation to support the pipe.

As a result, the conventional method in use today rarely employs these techniques but provides a simple metal saddle having a much longer arc which in turn is welded to the bottom of the clevis hanger. This wider saddle substantially increases the surface area upon which the insulation rests thereby spreading the compression pressures more evenly and avoiding damage. Consequently, one now utilizes the original insulation on the pipe throughout the much simplified assembly operation.

Not withstanding, there are still many problems associated with this current metal saddle approach. For example, while clevis hangers are standard, readily available commercial articles, to weld a curved metal saddle the metal must first be rolled. Thus, a special order is required since it is a custom job with significant increase in cost and substantial delays in receipt. Typically, the metal saddle is either welded to the hanger or to a support channel. The metal saddle and weld still promotes corrosion thereof as well as of the hanger reducing lifetime of the fixture; the presence of moisture, of course, aggravates corrosion of the metal.

Since metal saddles are relatively inflexible, several different sizes are required even for a standard clevis hanger in order to accomodate different sizes of insulated pipe. Thermal conductivity of the metal reduces the efficiency of the insulation. Edges of the metal saddles are rough thereby contributing to tearing of the pipe insulation.

While direct metal-to-metal welding or clamping is the strongest and securest and thus preferable for this purpose alone, several difficulties arise in connection with this practice wherein the pipe must be insulated. Even if the clamp or weld is subsequently wrapped or coated with insulation, there remains a conductive heat transfer path through the clamp or weld to the support structure, thus generating a significant heat transfer between the environment and the pipe. This substantially defeats the purpose of the insulation.

None of these prior art devices utilized for supporting and insulating pipes solve all of these problems. That is, none can satisfy these requirements while maintaining easy and economical manufacture, easy on-site assembly, reduction in labor hours and related cost while providing a superior assembly with considerable increased safety to the workers.

It is therefore an object of the present invention to provide a support device for insulated pipes which is capable of providing strong, lateral support in combination with effective insulation, adapted for easy assembly on the job site, simple in structure, and economical to manufacture.

It is another object to do the above by utilizing a plastic saddle having a clip portion in conjunction with a clevis hanger thereby eliminating the need for welding.

It is an object of the present invention to do the above by utilizing a plastic saddle having a drop-in twist-and-lock portion in conjunction with a support channel thereby eliminating the need for welding.

It is also an object to avoid the need for special insulation materials.

It is a further object to introduce enough flexibility into a single saddle to provide an adequate fit for several different size pipes.

It is still another object to substantially reduce the tendency of corrosion.

It is yet another object to substantially reduce thermal conductivity losses.

An additional object is to avoid the need to remove insulation and expose the bare pipe thereby using the insulated or noninsulated pipe as one finds it.

Another object of the instant invention is a major improvement in the method of fastening the saddle to a clevis hanger or a cross channel support thereby reducing labor costs.

A further object of the invention is to provide a means for retrofitting poorly installed insulated pipes which lay on a clevis hanger or a support channel in the absence of a shield or saddle of any kind.

SUMMARY OF THE INVENTION

According to the teaching of the present invention, a plastic pipe saddle for supporting an insulated pipe secured to a surface comprising: an arcuate molded flexible plastic saddle; a pair of flexible hinge-like joints molded integrally with the saddle of a thickness less than that of the saddle and running linearly therewith, for accommodating insulated pipes of varying overall diameters; stiffening ribs molded integrally with the saddle of a thickness greater than that of the saddle running linearly therewith, for strengthening the saddle under load; and means molded integrally with the saddle at the external central underside thereof for attachment of the saddle to a support means. The pipe saddle having holes in the upper sides thereof for retaining an optional plastic tie band preventing the pipe from moving in an upward direction upon vibration thereof.

A first support means including a U-shaped pipe-supporting member, which may be a clevis hanger, for cradling the pipe saddle and adjustable means for securing said U-shaped pipe-supporting member to an overhead surface. The pipe saddle wherein one of said stiffening ribs at the bottommost portion of the saddle having a notch therein for contacting the bottommost portion of said U-shaped member to prevent lateral movement therebetween the saddle and said U-shaped member. The pipe saddle wherein said means for attachment of the saddle to said first support means is a snap-on clip fixture further comprising a means for locking the saddle against the bottom of said U-shaped member preventing unlocking thereof. The pipe saddle wherein said snap-on clip fixture further comprises a means for locking the saddle against the bottom of a J-shaped wall support member attached to a vertical surface.

The means for attachment of the saddle further comprises a second support means including a support channel member for holding the pipe saddle and adjustable means for securing said support channel member to an overhead surface. The pipe saddle wherein said means for attachment of the saddle to said support channel member is a drop-in twist-and-lock fixture for locking the saddle against a locking edge of said support channel means preventing unlocking thereof. Said support channel member including an adjustable means for securing said support channel member to an underfoot surface.

BRIEF DESCRIPTION OF THE DRAWINGS

The above and other objects, features and advantages of the present invention will be more clearly understood from the following detailed description taken in conjunction with the accompanying drawings, in which.

DESCRIPTION OF THE PREFERRED EMBODIMENTS

It should be emphasized that while this invention solves the more complex problems related to the support of insulated piping, it further contemplates its use to support noninsulated metal or plastic pipe and cables. Thus, it is suitable to support plastic piping used to protect electrical cable bundles and the like, as well as piping transferring fluids at ambient temperature.

Figure 1:
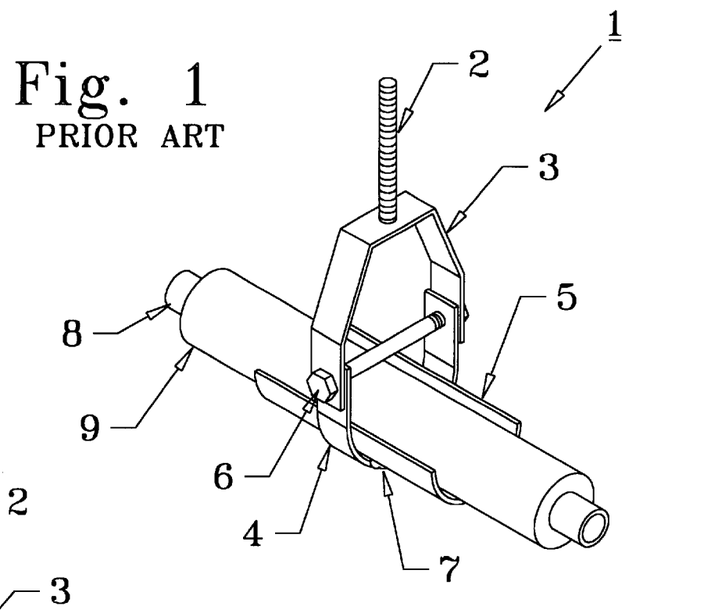
FIG. 1 is an isometric view of a prior art clevis hanger with a steel saddle welded thereto.

Illustrated in FIG. 1 and designated by the general reference character 1 is an isometric view of a clevis hanger with a welded saddle of the prior art. The insulated pipe support 1 is adapted to provide support to a hot or cold-carrying pipe installed under circumstances where insulation is desirable.

Figure 2:
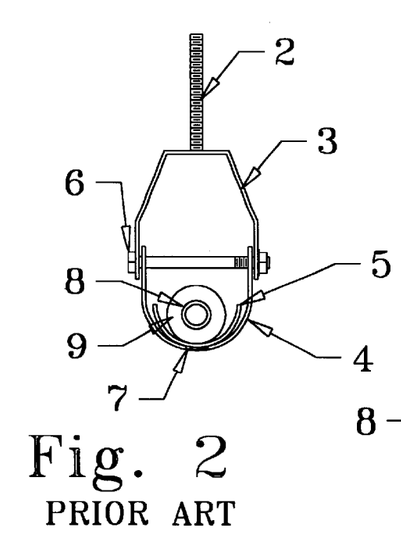
FIG. 2 is an end view of FIG. 1.
Figure 3:
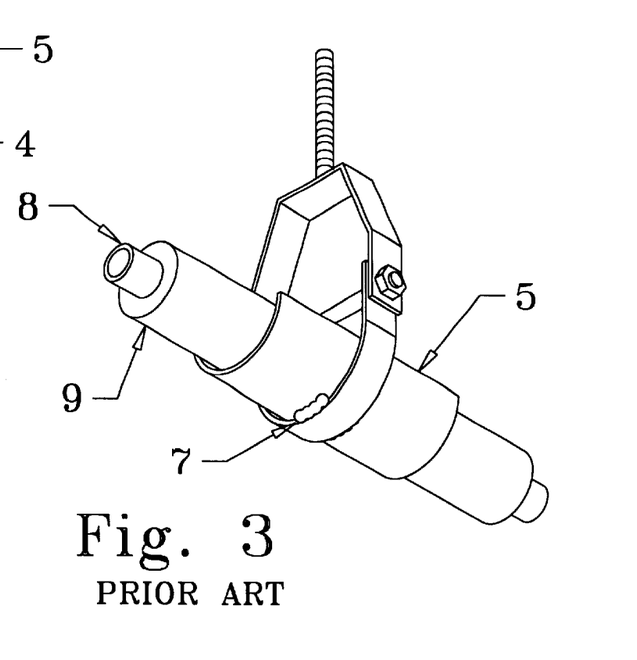
FIG. 3 is an isometric view from the underside of FIG. 1.

Pipe support device 1 includes a hanging threaded hanger 2 to which is screwed a top portion 3 of the clevis hanger. A bottom portion 4 of the clevis hanger has an arcuate rigid steel saddle 5 which is tack-welded at 7 thereto. Steel saddle 5 comprises approximately a half cylinder of semi-circular cross section. Pipe 8 with its insulation 9 is seated in saddle 5 and bottom portion 4 is affixed to top portion 3 using nut and bolt 6. FIG. 2 and FIG. 3 are an end view and an isometric view respecively from the underside of FIG. 1 illustratively more clearly the tack-welded area.

Figure 4A:
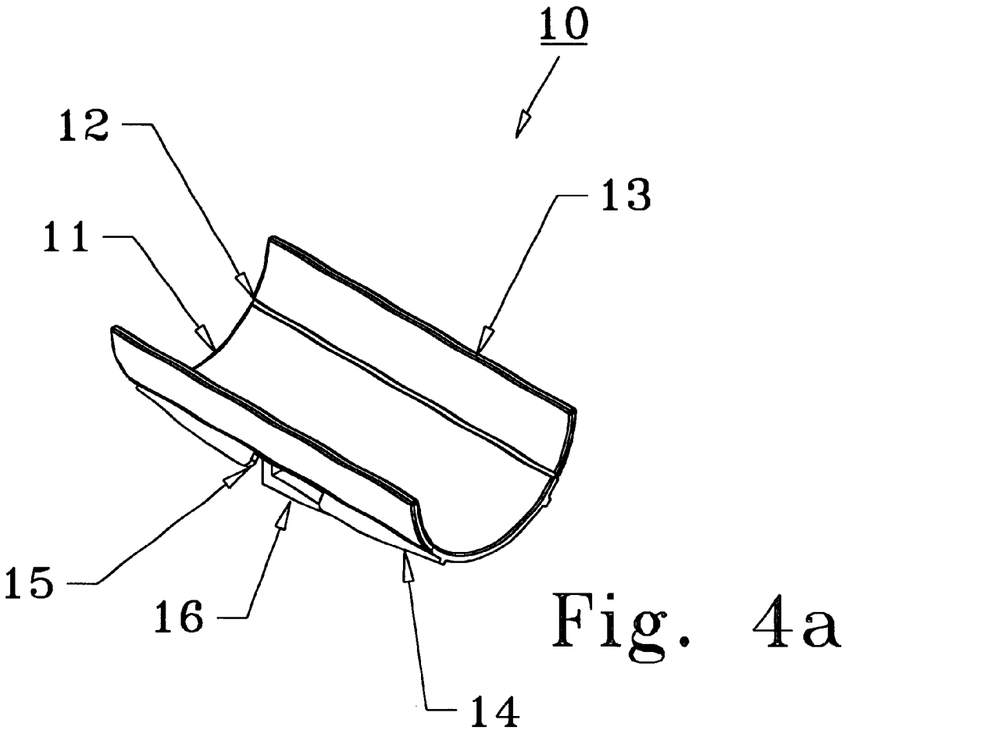
FIGS. 4a and 4b are an isometric view and an isometric view from the underside respectively of the hanger type plastic saddle of the invention.
Figure 4B:
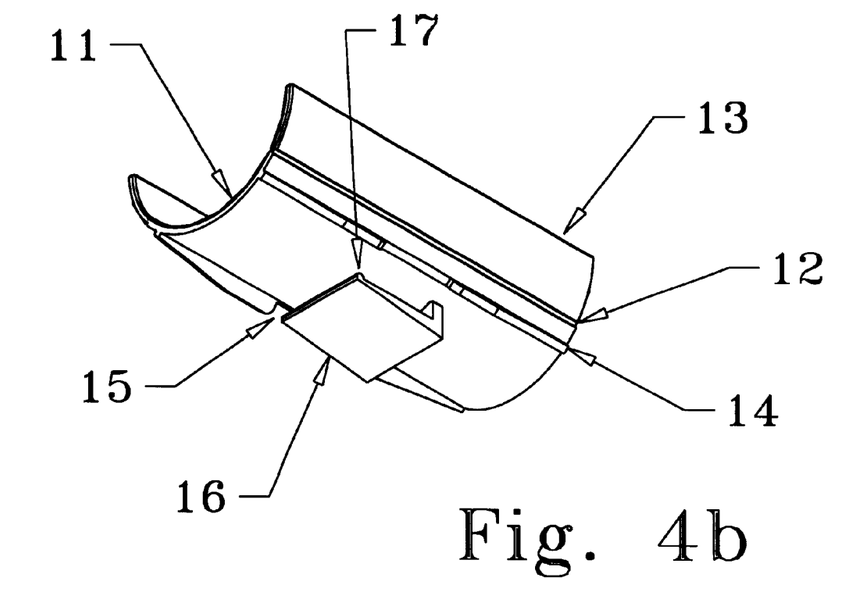
Figure 5A:
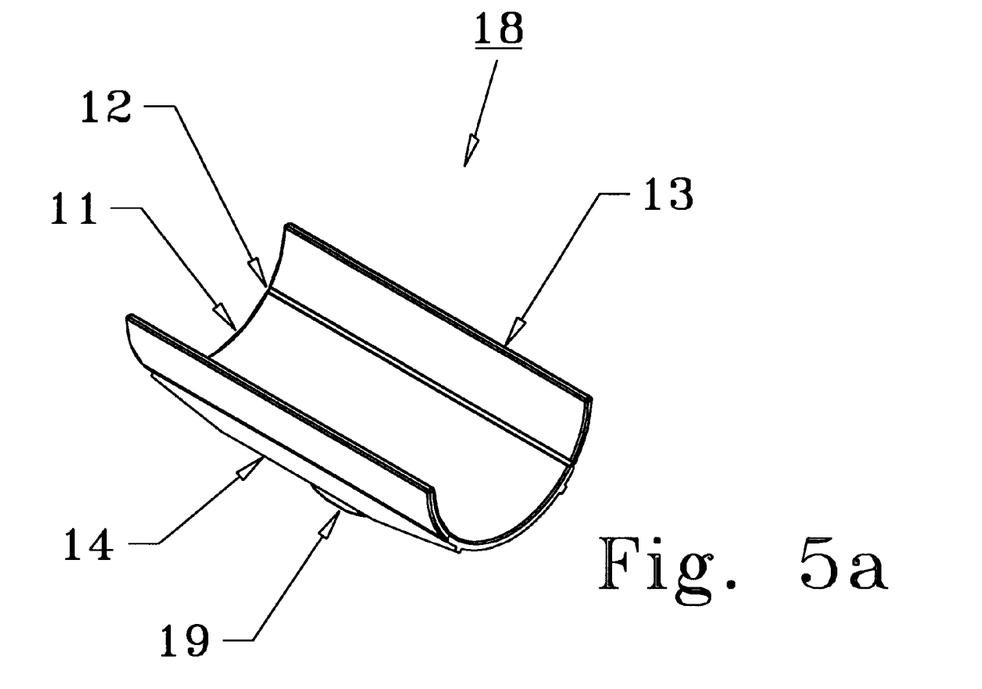
FIGS. 5a and 5b are an isometric view and an isometric view from the underside respectively of the support channel type plastic saddle of the invention.
Figure 5B:
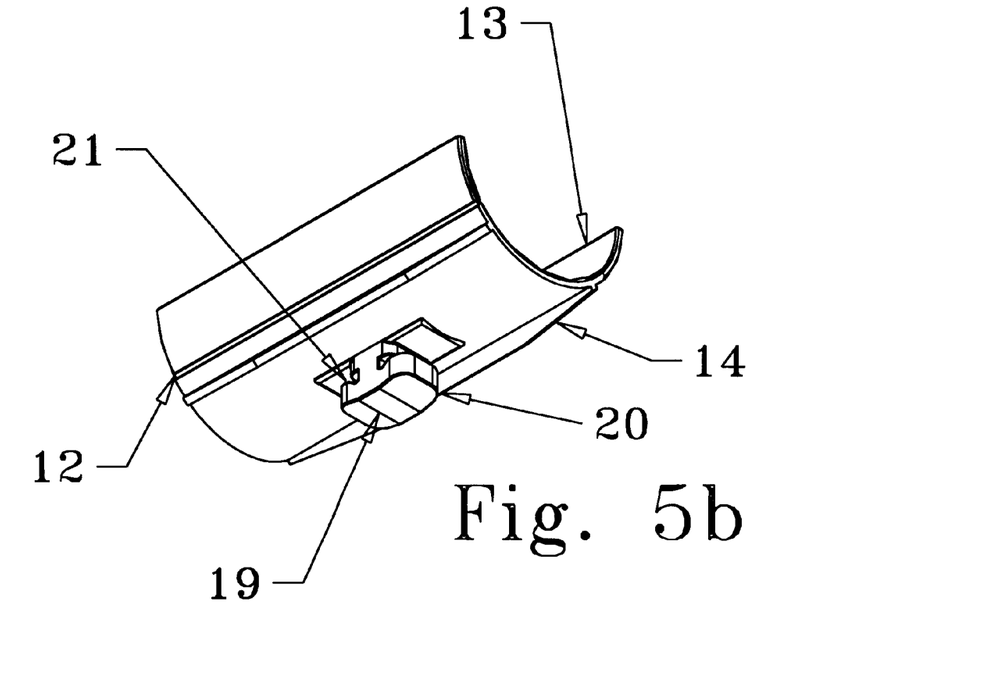

The focus of the present invention is on a one-piece molded plastic saddle having an intergrally molded snap-on clip FIG. 4b or drop-in/twist and lock portion FIG. 5b as a means for attachment to the bottom-portion 4 of the clevis hanger or the top portion of a support channel type 22 respectively thus simplifying assembly and obviating the need for a welded connection for seating an insulated pipe therein.

FIGS. 4a/4b are an isometric view and an isometric view of the underside respectively of a hanger-type 10 of a first embodiment of the molded plastic saddle of the instant invention. The main body molded saddle 11 has a flexible hinge-like joint 12 for accommodating insulated pipe of varying gross diameters. The saddle ear 13 is shown in both these figures. The saddle also comprises molded stiffeners and guide ribs 14 to prevent sagging of the plastic body upon extended use. These stiffeners 14 have a notch 15 at their center for allowing placement of bottom portion 4 of the clevis hanger and preventing lateral movement of the assembly. A snap-on clip 16 is best illustrated in FIG. 4b, as are stiffeners 14. Snap-on clip 16 obviates the need for welded construction. One merely snaps clip 16 onto bottom portion 4 of the clevis hanger while the ball end 17 of clip 16 locks the saddle assembly 10 into place for reception of insulated pipe 9/8 therein. This snap-on clip 16 configuration may also be used to attach the pipe saddle 10 to a J-shaped wall support member (not shown) suspended in cantilever-like fashion from a vertical surface.

FIGS. 5a/5b are an isometric view and an isometric view of the underside respectively of a support channel-type 18 of a second embodiment of the molded plastic saddle of the instant invention. The twist-locking bottom area 19 of the molded plastic drop-in twist-and-lock saddle 18 is shown in FIG. 5a, but more clearly in FIG. 5b. Also in FIG. 5b the rounded side 20 of the twist-lock portion as well as its locking edge 21 are illustrated. For better views of the locking mechanisms, see FIG. 13 for a snap-in version and FIG. 14 for the twist-and-lock version.

These molded plastic saddles have rounded smooth edges which overcome the problems of cutting insulation which is common when using metal saddles having sharp edges and corners.

Figure 6:
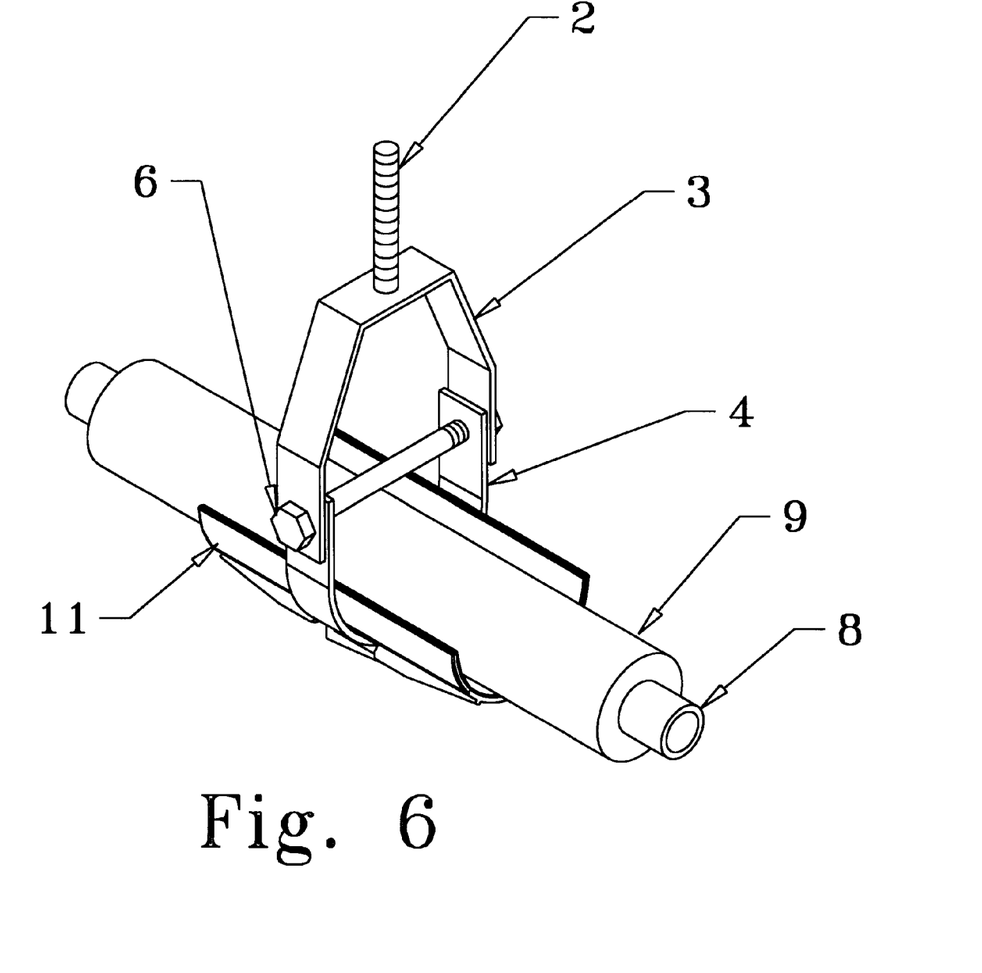
FIG. 6 is an isometric view of the FIG. 4 saddle snapped-on to a clevis hanger.
Figure 7:
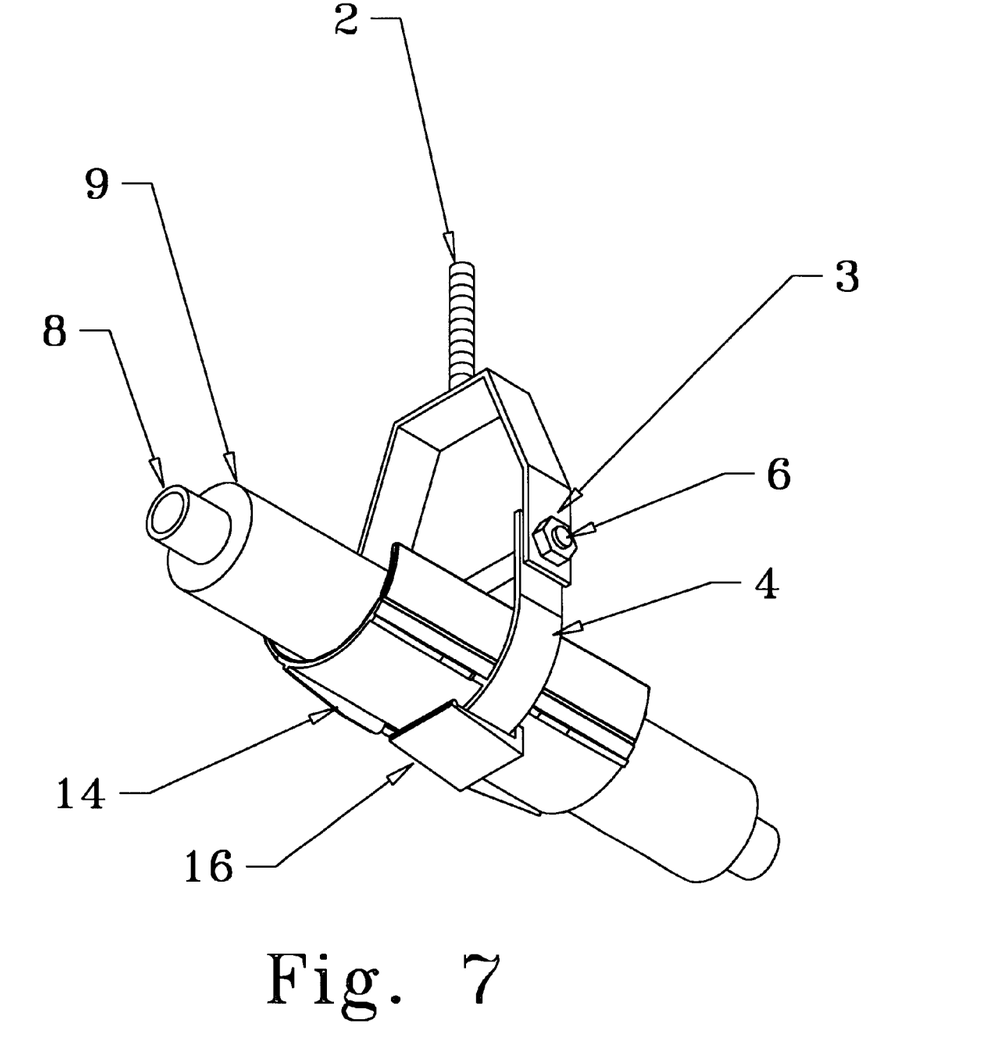
FIG. 7 is an isometric view from the underside of the FIG. 4 saddle snapped-on to a clevis hanger.

FIG. 6 is an isometric view of the molded plastic snap-on saddle 10 of the invention seated in a conventional steel clevis hanger. FIG. 7 is an isometric view of FIG. 6 from the underside illustrating the plastic molded pipe saddle stiffener/guide ribs 14 and the plastic molded pipe saddle snap-on clip 16. The stiffener/guide ribs 14 portions of the saddle 10 are thickened linear sections provided for minimizing any tendency of saddle 10 to sag in extended use; while the guide feature consists of the ribs 14 having a notch 15 in the center portion thereof allowing seating of saddle 10 on the bottom portion 4 of the clevis hanger preventing any shifting movement in a direction linear with pipe 8 and its insulation 9. This can best be seen in FIG. 8 which is an end view of FIG. 7. Furthermore, in FIG. 7 is shown saddle 10 having a thinner linear section 12 allowing saddle 10 to flex permitting pipe 8 with insulation 9 of slightly larger diameters to be easily accommodated. This provides an important advantage over conventional metal saddles lacking this flexibility. Therefore, one plastic saddle can satisfy the requirements of several pipe/insulation systems of varying diameters.

Figure 8:
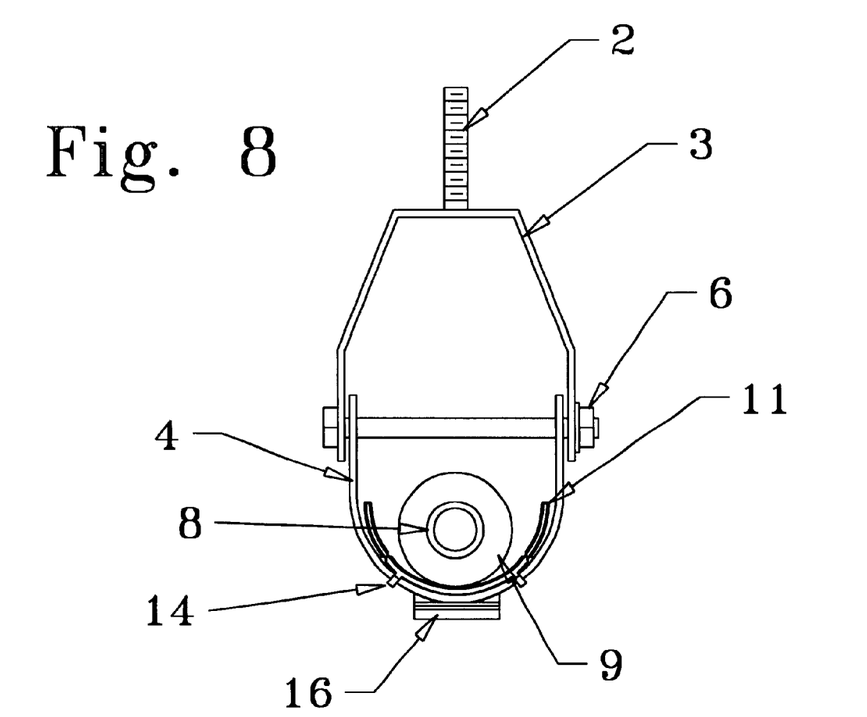
FIG. 8 is and end view of FIG. 6.
Figure 9:
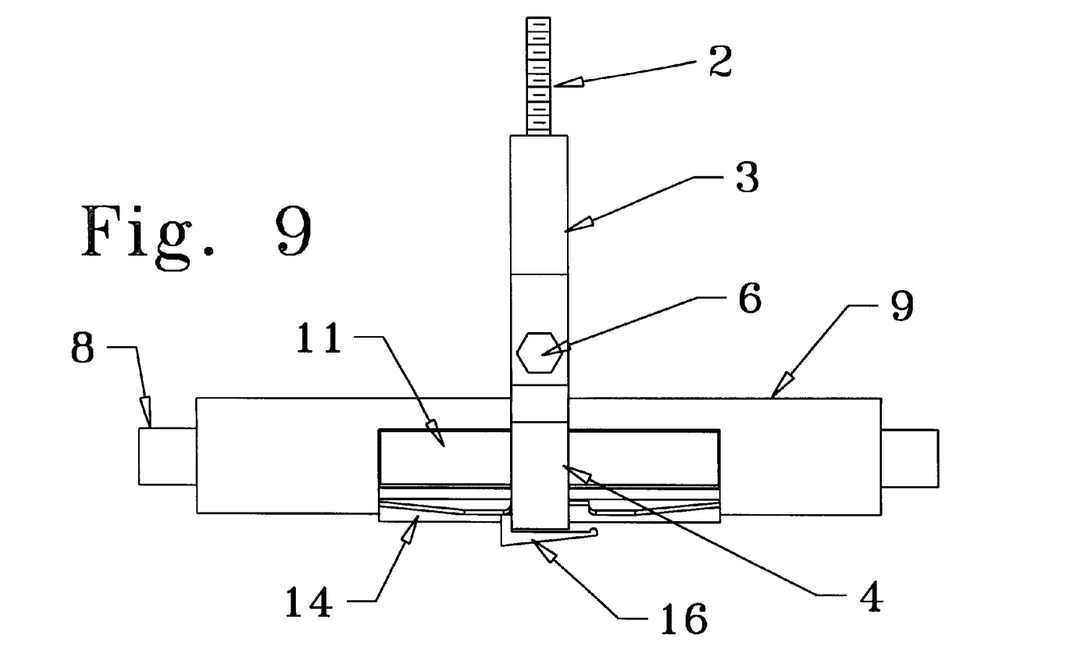
FIG. 9 of a side view of FIG. 6.

FIG. 8 more clearly shows the projection of the stiffener/guide ribs 14 as well as snap 16. FIG. 9, a side view of FIG. 7 and FIG. 8, meanwhile, presents a much clearer view of snap-on clip 16 in place on the bottom portion 4 of the clevis hanger.

As mentioned above, there are ways other than that of hanging a pipe directly from a hanging threaded rod 2 by means of a clevis hanger such as shown as elements 3/4. For example, oftentimes one finds or installs a support channel 22, as shown in the isometric view of FIG. 10, itself suspended from two hanging threaded rods 2 in a trapeze-like fashion. Such a configuration allows support of a plurality of insulated pipes or other types of fixtures or devices: cable bundles within plastic pipes, clamps and the like. In such a situation, snap-on clip 16 is no longer suitable and a second embodiment of the instant invention is required.

It should be noted that when a pipe support technician arrives at a job site, threaded rods hanging from a ceiling are ubiquitous thus allowing him to use the first embodiment of the instant invention. On the other hand, oftentimes the technician may find support channels in place or may choose to install support channels in trapeze fashion for supporting a plurality of pipes, thus using the second embodiment of the invention.

In addition. plastic pipe saddle 10 or 18 may also have holes (not shown) therein in the upper sides of the pipe saddle for retaining an optional plastic tie band (not shown) preventing the saddle from moving in an upward direction upon vibration thereof.

Figure 14:
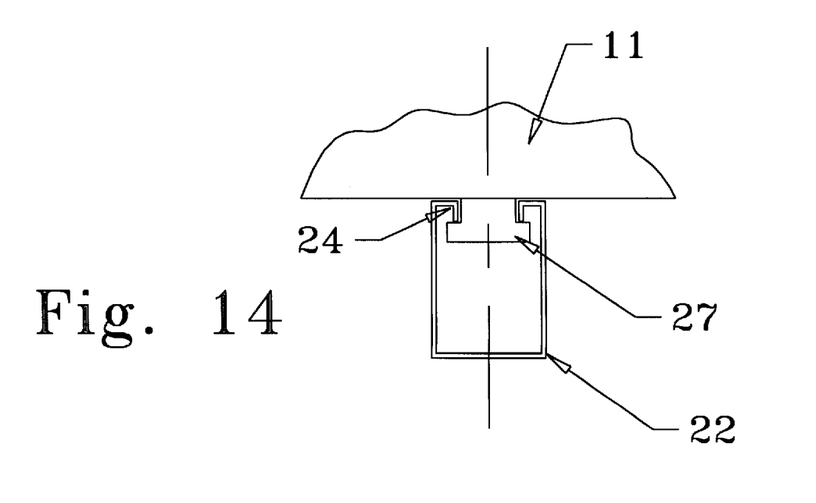
FIG. 14 is an end view of a drop-in twist and lock version of a saddle within the support channel of FIG. 13.

The solution to the problem solved with the second embodiment is the use of a plastic molded saddle 18 as illustrated in FIG. 5b having as a portion thereof an integratedly molded drop-in twist-and-lock (second embodiment) area portion 19 which is dropped into support channel 22 wherein locking edge 21 of channel 22 after saddle 18 is twisted 90° locks saddle 18 in place as best illustrated in FIG. 14.

Figure 10:
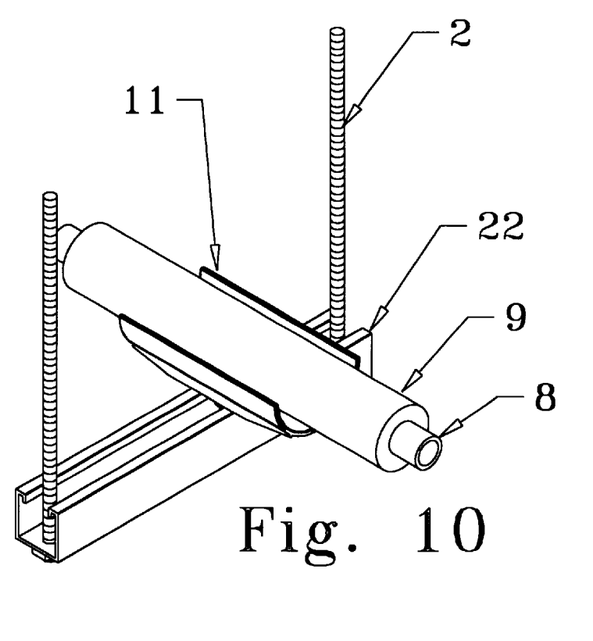
FIG. 10 is an isometric view of the FIG. 5a saddle twist-locked into a support channel which channel is suspended in trapeze fashion from two (2) threaded rods.
Figure 11:
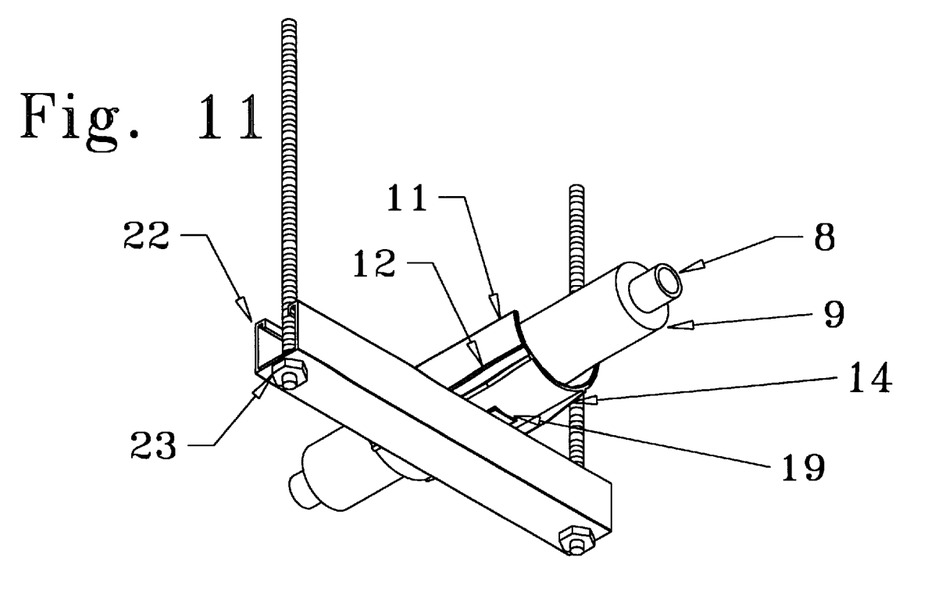
FIG. 11 is an isometric view from the underside of FIG. 10.
Figure 12:
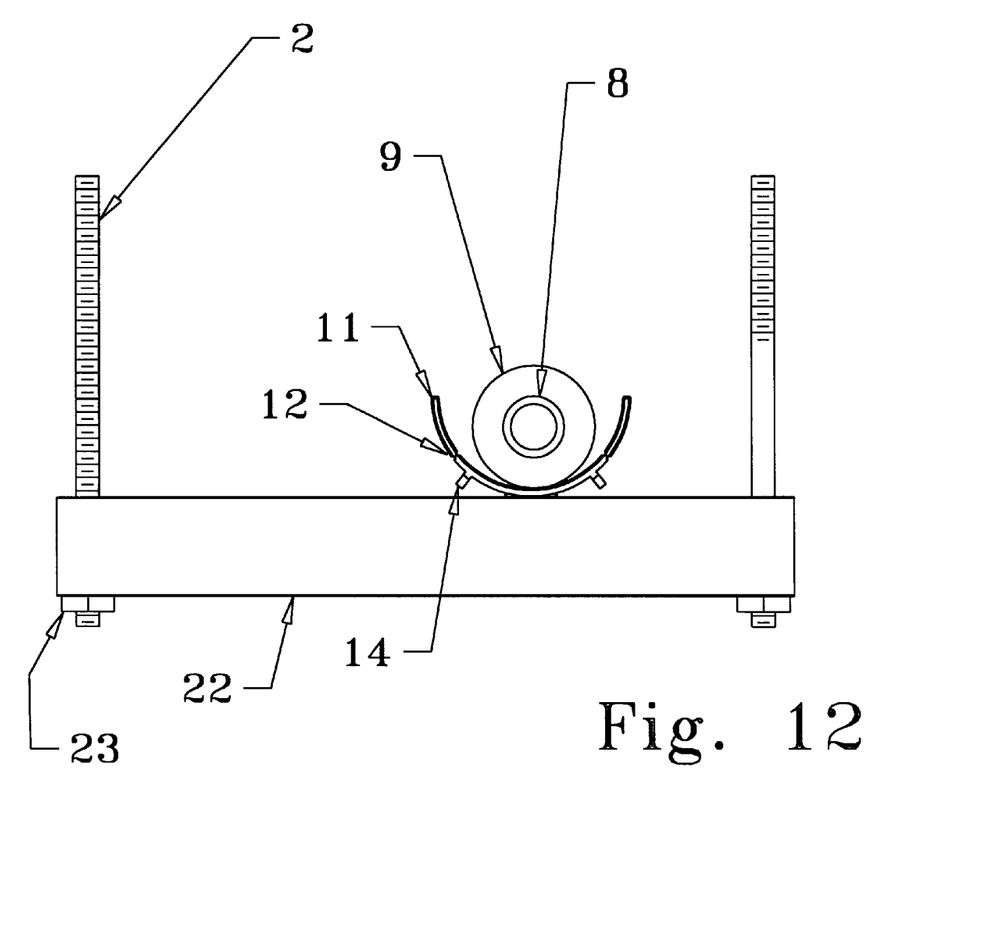
FIG. 12 is an end view of FIG. 10.

FIG. 10 and FIG. 11 illustrate molded plastic drop-in twist-and-lock saddle 18 in place on a support channel 22 which in turn is suspended from the ends of two hanging threaded rods 2 forming a trapeze configuration, the entire assembly supported by hanging threaded rod nuts 23. A generalized profile end view of this second embodiment in its final position is shown in FIG. 12.

Figure 13:
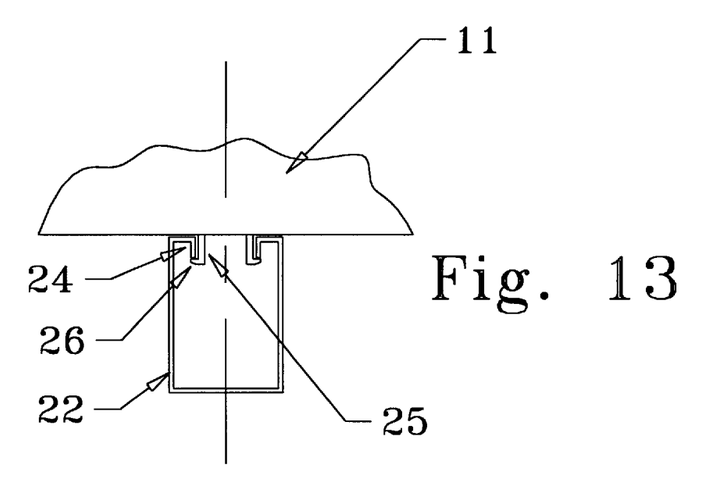
FIG. 13 is a detailed end view of a snap-in saddle within a support channel illustrating the snap-in legs of the saddle in place.

Detailed profile end views of the locking areas are illustrated in FIG. 13 and FIG. 14. FIG. 13 shows snap-in legs 25 each leg having a snapping foot 26 locked into return leg 24 of locking edge 21. It should be noted, that snap-in legs 25 may be slid into support channel 22 provided that 22 is not encumbered by hanging threaded rods 2 at its ends. Thus, where support channel 22 is not in a hanging position as when it is bolted to a pedestal on a floor, for example, this embodiment may be slid in. In FIG. 14 is shown a drop-in twist-and-lock 18 wherein drop-in twist-and-lock portion 27 is locked into return leg 24 of locking edge 21. Once in the support channel, the saddle can be conveniently positioned by sliding.

Sometimes an insulated pipe is supported by a bare clevis hanger without any saddle. In such a poorly installed situation, the saddle of the subject invention can be retrofitted with the insulation and clevis hanger in place. One does not have to disassemble the clevis hanger or weld a shield thereon; welding can be a fire hazard under these conditions. In another typical poor installation where the insulaetd pipe is laying on the support channel itself without a saddle or shield, one needs only to drop in the plastic saddle and rotate in order to retrofit the system.

The plastic material in addition to possessing structural characteristics necessary for its function, should also be pliable enough to form a snug fit around the insulation; and, have some fire and smoke retardant capability. While there are a number of available plastics suitable for this kind of application, both polypropylene and acrylonitrile butadiene styrene (ABS) are preferred.

Thus, a method of supporting a pre-existing fully insulated pipe is quite simple. After providing a plastic pipe saddle having a snap-on fixture, then fastening and locking said snap-on fixture to the bottom portion of a clevis hanger which bottom portion having been previously separated from its top portion, and then cradling the thus attached pipe saddle to said bottom portion of the clevis hanger up to the insulated pipe, next joining the upper portion of the clevis hanger (this upper portion is probably already fastened to a threaded hanging rod) to the lower portion, and inserting a bolt and nut, the job is completed.

Similarly, in the case of the second embodiment, after providing a plastic pipe saddle having a drop-in twist-and-lock fixture, then dropping-in the fixture in a position parallel to the support channel, next twisting the thus dropped-in fixture to a position 90° or perpendicular to the support channel, thereby engaging the fixture with the locking edge of said support channel member, then joining the assembly by cradling with the insulated pipe, and inserting a bolt and nut, the job is done.

In summary then, the instant invention has achieved all the objects set out above. This molded plastic pipe saddle having as an integral portion thereof either a snap-on or drop-in twist-and-lock feature substantially reduces corrosion and thermal conductivity losses experienced with the steel versions. Welding, of course, is unnecessary saving considerable additional expense for each unit and eliminating the need for special ordering involving delayed deliveries. Furthermore, a technician installing the system uses the insulated pipe as he finds it without the need for stripping insulation, exposing bare pipe as in other conventional approaches. Probably most important is the method of fastening a saddle to a clevis hanger or a support channel by merely locking it into place with considerable reduction in time and labor costs. In addition, the flexibility of the plastic accommodates various sizes of insulated pipe reducing the possibility of misfits while optimizing support integrity.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A plastic pipe saddle for supporting an insulated pipe secured to a surface comprising:
   an arcuate molded flexible plastic saddle;
   a pair of flexible hinge-like joints molded integrally with the saddle of a thickness less than that of the saddle and running linearly therewith, for accommodating insulated pipes of varying overall diameters;
   stiffening ribs molded integrally with the saddle of a thickness greater than that of the saddle running linearly therewith, for strengthening the saddle under load; and
   means molded integrally with the saddle at the external central underside thereof for attachment of the saddle to a support means.

2. The pipe saddle of claim 1 having holes in the upper sides thereof for retaining an optional plastic tie band preventing the pipe from moving in an upward direction upon vibration thereof.

3. The pipe saddle of claim 1 further comprising a first support means including a U-shaped pipe-supporting member for cradling the pipe saddle and adjustable means for securing said U-shaped pipe-supporting member to an overhead surface.

4. The pipe saddle of claim 3 wherein said U-shaped pipe-supporting member is a clevis hanger.

5. The pipe saddle of claim 3 wherein one of said stiffening ribs at the bottommost portion of the saddle having a notch therein for contacting the bottommost portion of said U-shaped member to prevent lateral movement therebetween the saddle and said U-shaped member.

6. The pipe saddle of claim 3 wherein said means for attachment of the saddle to said first support means is a snap-on clip fixture further comprising a means for locking the saddle against the bottom of said U-shaped member preventing unlocking thereof.

7. The pipe saddle of claim 6 wherein said snap-on clip fixture further comprises a means for locking the saddle against the bottom of a J-shaped wall support member attached to a vertical surface.

8. The pipe saddle of claim 1 wherein the means for attachment of the saddle further comprises a second support means including a support channel member for holding the pipe saddle and adjustable means for securing said support member to an overhead surface.

9. The pipe saddle of claim 8 wherein said means for attachment of the saddle to said support channel member is a drop-in twist-and-lock fixture for locking the saddle against a locking edge of said support channel means preventing unlocking thereof.

10. The pipe saddle of claim 8 wherein said support channel member includes an adjustable means for securing said support channel member to an underfoot surface.

11. The pipe saddle of claim 8 wherein said means for attachment of the saddle to said support channel member is a snap-in fixture integral with the underside of the saddle which can be slid into position within said support channel.

12. A method for installation of a saddle onto a support channel connected to hanging rods comprising the steps of:

providing a molded plastic saddle having a drop-in twist and lock attachment fixture as an integral part of the bottom thereof;

positioning said drop-in twist and lock attachment fixture of said molded plastic saddle linearly above the support channel;

dropping-in said twist and lock fixture into the support channel;

rotating said twist and lock fixture 90°; and locking said twist and lock fixture onto a pair of locking edges of the support channel.

13. A method for installation of a saddle onto a clevis hanger comprising the steps of:

providing a molded plastic saddle having a snap-on clip as an integral part of the bottom thereof;

positioning said molded plastic saddle linearly in a running line of an insulated pipe against a bottom portion of a clevis hanger;

snapping said snap-on clip onto said bottom portion of said clevis hanger; and locking said snap-on clip into place by moving said clip forward.

\* \* \* \* \*